US008380073B2

(12) United States Patent
Edwards et al.

(10) Patent No.: US 8,380,073 B2
(45) Date of Patent: Feb. 19, 2013

(54) OPTICAL TRANSCEIVER IMPLEMENTED WITH TUNABLE LD

(75) Inventors: Phillip Edwards, San Jose, CA (US); Jignesh Shah, San Jose, CA (US)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/114,636

(22) Filed: May 24, 2011

(65) Prior Publication Data

US 2012/0301152 A1 Nov. 29, 2012

(51) Int. Cl.
*H04B 10/00* (2006.01)

(52) U.S. Cl. ........ 398/135; 398/138; 398/164; 398/182; 398/183

(58) Field of Classification Search .................. 398/135, 398/138, 139, 164, 182, 183, 134
See application file for complete search history.

(56) References Cited

U.S. PATENT DOCUMENTS

| 6,583,910 | B1 * | 6/2003 | Satoh ............................ 398/182 |
|---|---|---|---|
| 6,801,553 | B2 | 10/2004 | Imaki et al. |
| 7,038,866 | B2 | 5/2006 | Yoshimoto et al. |
| 7,177,547 | B1 * | 2/2007 | Case et al. .................... 398/135 |
| 7,416,353 | B2 * | 8/2008 | Yoshikawa et al. ............. 385/92 |
| 7,634,197 | B2 * | 12/2009 | Nelson et al. ................. 398/135 |
| 7,708,475 | B2 * | 5/2010 | Wong et al. ..................... 385/93 |
| 8,145,059 | B2 * | 3/2012 | Yu ................................. 398/136 |
| 8,160,450 | B2 * | 4/2012 | Yutani .......................... 398/135 |
| 2004/0001712 | A1 * | 1/2004 | Tomofuji ........................ 398/40 |
| 2006/0098984 | A1 * | 5/2006 | Sakai et al. .................... 398/138 |
| 2006/0140554 | A1 * | 6/2006 | Oki ................................ 385/92 |
| 2006/0171431 | A1 * | 8/2006 | Kan et al. ..................... 372/38.1 |
| 2007/0183790 | A1 * | 8/2007 | Matsumoto ................... 398/182 |
| 2008/0056728 | A1 * | 3/2008 | Kozato .......................... 398/183 |
| 2008/0292311 | A1 * | 11/2008 | Daghighian et al. ............. 398/9 |
| 2009/0041471 | A1 * | 2/2009 | Alexander et al. ............ 398/183 |
| 2009/0123116 | A1 * | 5/2009 | Tanaka et al. ................... 385/92 |
| 2009/0269075 | A1 * | 10/2009 | Wong et al. ................... 398/135 |
| 2009/0324255 | A1 * | 12/2009 | Nakamoto ..................... 398/198 |

* cited by examiner

*Primary Examiner* — Daniel Washburn
*Assistant Examiner* — Hibret Woldekidan
(74) *Attorney, Agent, or Firm* — Venable LLP; Michael A. Sartori

(57) ABSTRACT

An optical transceiver implemented with a tunable LD is disclosed. The tunable LD is installed within a TOSA (Transmitter Optical Subassembly). The optical transceiver provides two circuit boards arranged in the up-and-down relation. The TOSA is primarily connected to the second board but signals to drive the tunable LD are carried on an FPC board directly connected to the first board that mounts a driver circuit for the tunable LD.

8 Claims, 12 Drawing Sheets

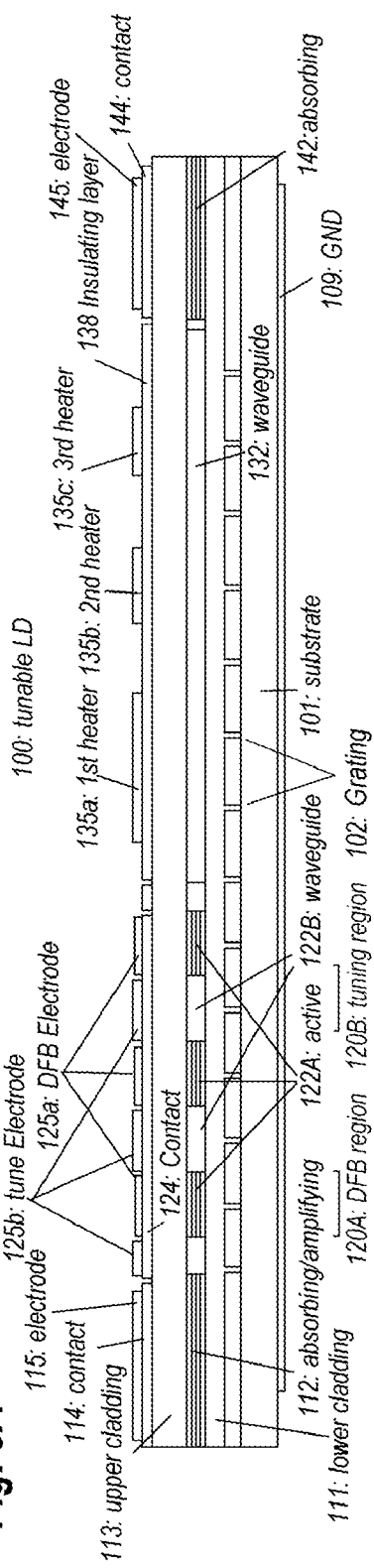
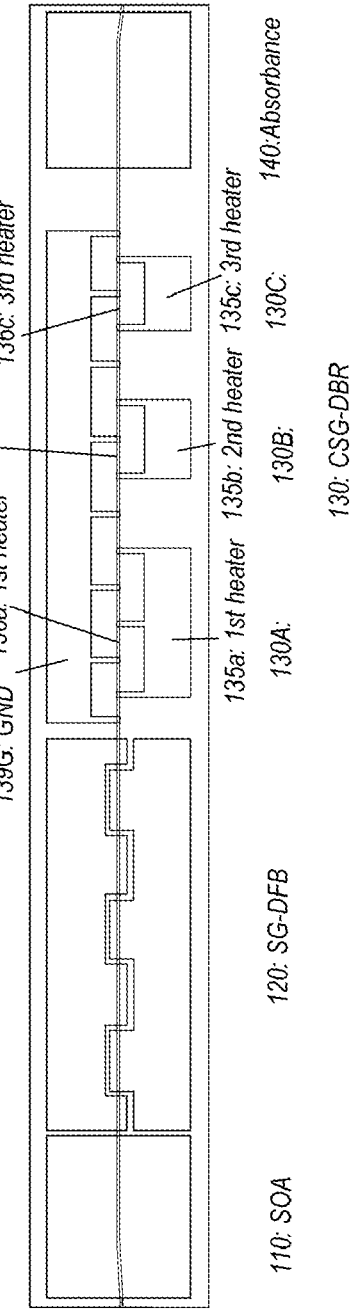
Fig. 3A
Fig. 3B

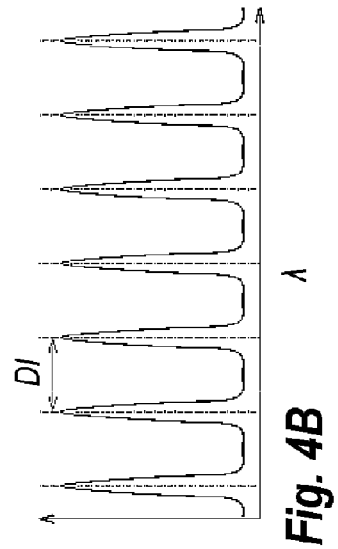
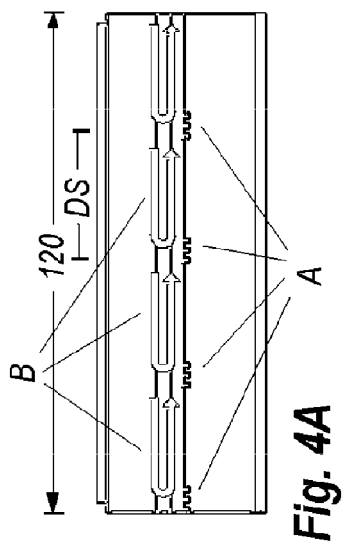
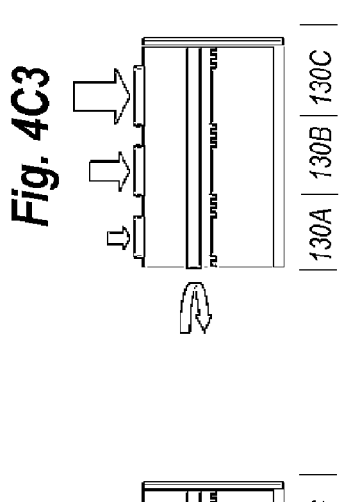
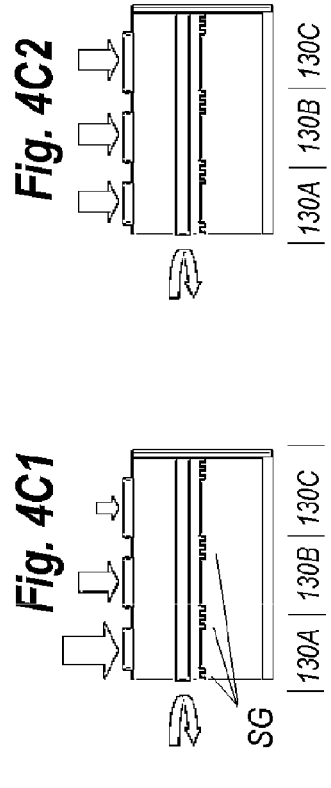
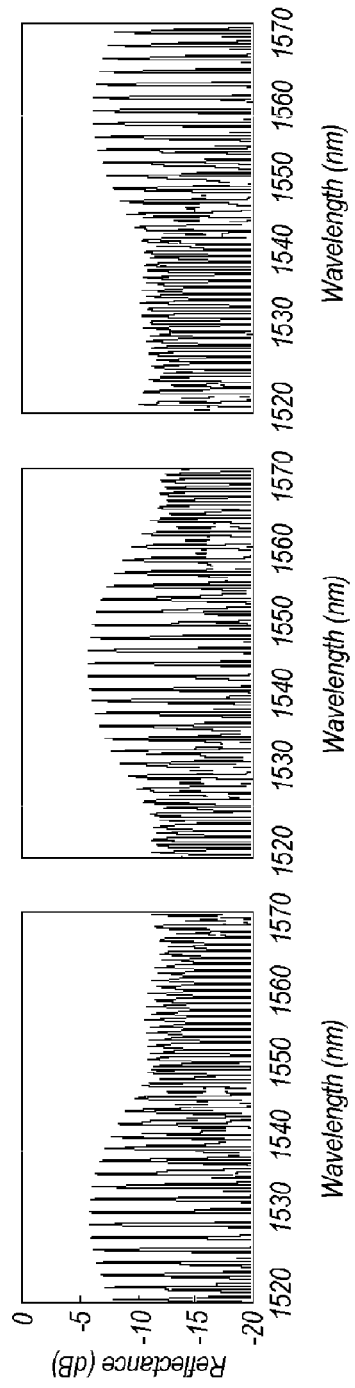

OPTICAL TRANSCEIVER IMPLEMENTED WITH TUNABLE LD

BACKGROUND OF THE INVENTION

1. Field of the Invention

The present invention relates to an optical transceiver, in particular, the present invention relates to an optical transceiver that installs a tunable laser diode (hereafter denoted as LD) integrated with a semiconductor optical modulator, which is hereafter called as iTLD.

2. Related Prior Art

The United State patent, U.S. Pat. No. 7,416,353, has disclosed an optical transceiver that installs two circuit boards arranged in up-and-down relation in the housing and electrically connected with a flexible printed circuit (hereafter denoted as FPC) board to each other. But, the optical transceiver disclosed in prior art above installs two optical subassemblies (hereafter denoted as OSA) electrically coupled to only one of the two circuit boards.

SUMMARY OF THE INVENTION

One aspect of the present invention relates to an optical transceiver that comprises of a transmitter optical subassembly (hereafter denoted as TOSA), a first circuit board, a second circuit board, a first FPC and a second FPC. The TOSA installs a tunable LD and an optical modulator, and is driven by a driving signal with high frequency components higher than, for instance, 10 GHz. The first circuit board mounts the driving circuit that generates the driving signal to drive the optical modulator. The second circuit board mounts a bias circuit to provide biases tuning the emission wavelength of the tunable. The first FPC board electrically connects the first circuit board with the second circuit board. The second FPC board connects the TOSA directly to the first circuit board. An arrangement, where the optical transceiver has the two FPC boards and two circuit boards, and the driving signal is provided directly to the TOSA from the first circuit board without passing the first FPC board and the second circuit board, may suppress degradation of driving signals

BRIEF DESCRIPTION OF THE DRAWINGS

The foregoing and other purposes, aspects and advantages will be better understood from the following detailed description of a preferred embodiment of the invention with reference to the drawings, in which:

FIG. 3A is a side cross section and FIG. 3B is a plan view of a tunable LD implemented within the optical transceiver;

FIG. 4A explains an optical mechanism occurred in the SG-DFB region, FIG. 4B shows an emission spectrum of the SG-DFB region, and FIGS. 4C1 to 4C3 explain an optical mechanism appeared in the CSG-DBR region in connect ion with the temperature distribution thereof;

DETAILED DESCRIPTION OF PREFERRED EMBODIMENTS

Figure 1:
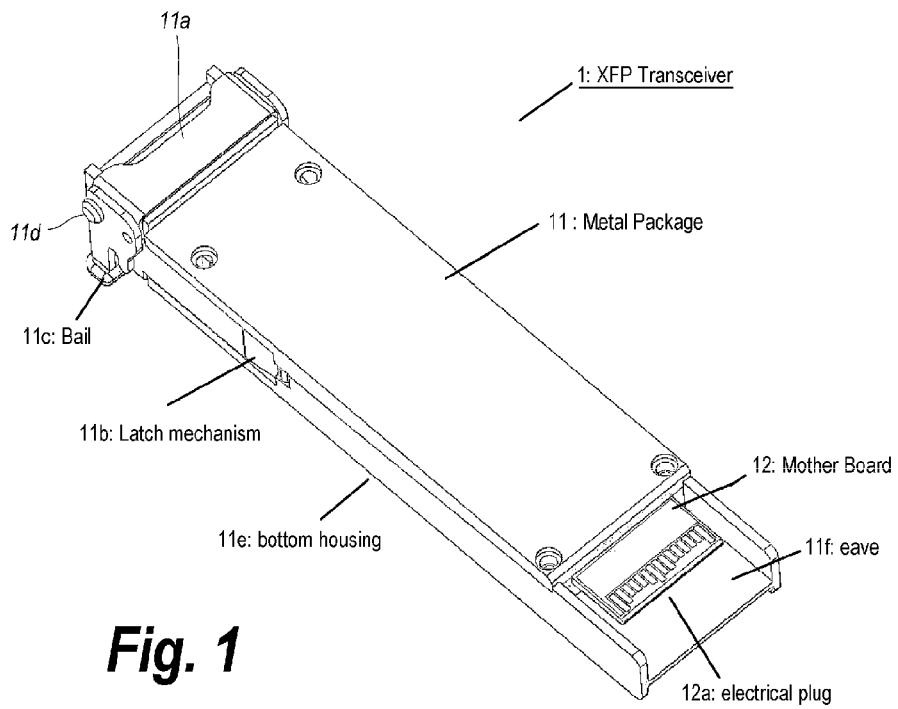
FIG. 1 is an external view of an optical transceiver following the XFP standard.

FIG. 1 is an outer appearance of an optical transceiver according to an embodiment of the present invention. The optical transceiver 1 shown in FIG. 1 provides a housing whose arrangement obeys an agreement of, what is called in the multi-source agreement (MSA), the XFP transceiver and is made of metal. Optical components and electrical components, such as a transmitter optical sub-assembly (TOSA), a receiver optical sub-assembly (ROSA), and an electronic circuit electrically connected to those optical sub-assembly (OSA) installed on circuit boards, are enclosed within the metal housing 11. The forward side of the housing 11 provides an optical receptacle 11a into which an external optical connector is inserted. That is, inserting the optical connector into the optical receptacle 11a, which mates the ferrule provided in an end of the optical connector with the sleeve protruding within the optical receptacle 11a, the optical fiber in the optical connector may optically couple with the optical device in the OSA. The side of the optical receptacle assembles with a bale 11c with a U-shape. Pivoting the bale 11c in front of the optical receptacle so as to cross the receptacle, a mechanism cooperating with the base 11c may release the latch 11b that engages the optical transceiver 1 with the cage of the host system. When the optical receptacle 11a receives the external optical connector, which interferes with the rotation of the bail 11c, the optical transceiver 1 is unable to be released from the cage.

On the other hand, the rear of the optical transceiver 1 exposes the end of the circuit board 12 where an electrical plug 12a is formed. This plug 12a mates with the electrical connector prepared in the host system to establish the communication between the transceiver 1 and the host system. Because the plug has a plurality of electrodes, part of which has a length different from the others. Inserting the plug into the connector, electrodes for the power supply and the ground, whose lengths are longer than the others, first establish the connection, then; the electrodes for the signals with shorter lengths come in contact. Thus, the power supply is first stabilized; then the signal transmission may be performed under a stabilized condition, which may save procedures to turn off the power of the host system at the mating of the plug 12a with the connector. Optical transceivers providing such mechanism to latch it to the host system and functions to save the power off are called as the hot-pluggable transceiver.

Figure 2:
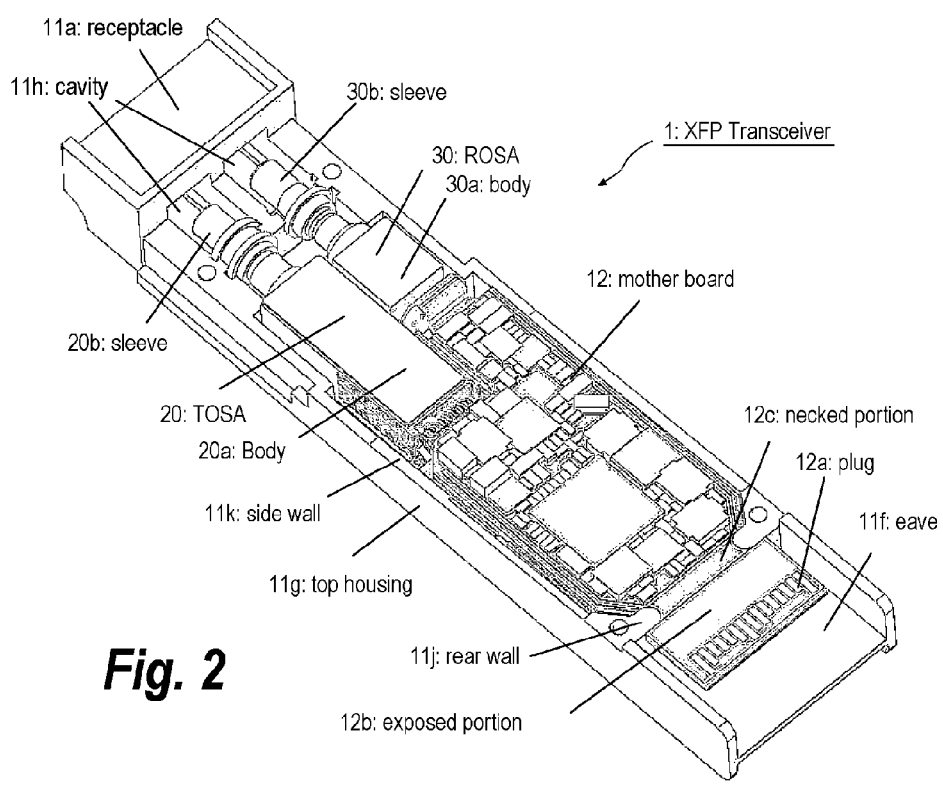
FIG. 2 shows an inside of the optical transceiver shown in FIG. 1.

FIG. 2 shows an inside of the housing 11. The optical transceiver 1 of the present embodiment provides OSAs, 20 and 30, each having a rectangular package, 20a and 30a, and often called as the butterfly module. A sleeve, 20b or 30b, extending from the front wall of the package, 20a and 30a, protrudes in the cavity 11h of the optical receptacle 11a. The sleeve, 20b and 30b, may receive the ferrule of the external optical connector in this cavity 11h. The circuit board 12 has a neck 12c with a narrower width in a rear portion thereof and an exposed area 12b outside of the neck 12c where the plug 12a is formed. The neck 12c is set between the rear walls 11j and may absorb a stress caused in the insertion/extraction of the plug with the connector so as not to affect the stress to the OSAs, 20 and 30. The directional relation of the optical transceiver 1, that is, the front and the rear are the sake of the explanation. The specification presenter below merely describes that the front is a side where the optical receptacle 11a is provided, while, the rear is the other side where the plug is formed.

The optical transceiver 1 according to an embodiment of the present invention installs a wavelength tunable LD integrated with a semi conductor optical modulator; accordingly, the description below refers this device as the integrated tunable LD (iTLD). Next, the iTLD will be described; in particular, the structures and the driving operations thereof will be described in detail.

The optical transceiver 1 according to the present embodiment installs a tunable LD. Next, detail of the structure and the operation of the tunable LD will be described.

FIGS. 3A and 3B are sectional and plan views of the iTLD 100 according to the present embodiment. The iTLD 100 includes in the laser section thereof and on a common semiconductor substrate 101, (a) a region 110 of the semiconductor optical amplifier (SOA), (b) a region 120 of the sampled grating distributed feedback laser (SG-DFB), (c) a region 130 of the chirped sampled grating distributed Bragg Reflector (CSG-DBR), and (d) a region 140 of the optical absorption (OA).

The SOA region 110 includes a lower cladding layer 111, an amplifying layer 112, an upper cladding layer 113, a contact layer 114, and an electrode 115, where they are stacked on the common substrate 101 in this order. The SG-DFB region 120 includes on the substrate 101 the lower cladding layer 111, an active layer 122, the upper cladding layer 113, another contact layer 124, and two types of electrodes of the DFB electrodes 125a and the tuning electrodes alternately arranged along an optical axis of the iTLD 100. The embodiment shown in FIGS. 3A and 3B iterates three sets of respective electrodes. The CSG-DBR region 130 includes on the common substrate 101 the lower cladding layer 111, an optical guiding layer 132, the upper cladding layer 113, an insulating film 138, and a plurality of heaters, 136a to 136c, which are arranged along the optical axis and between respective heater electrodes, 135a to 135c, and the ground electrode 139G. The ground electrode 139G is common to three independent heater electrodes, 135a to 135c; that is, six films constitute the first heater 136a arranged between the first heater electrode 135a and the ground electrode 139G, four thin films constitute the second heater 135b arranged between the second heater electrode 135b and the ground electrode 139G; and four thin films constitute the third heater 136c arranged between the third heater electrode 135c and the ground electrode 139G. The OA region 140 includes on the common substrate 101 the lower cladding layer 111, an absorption layer 142, the upper cladding layer 113, another contact layer 144 and an electrode 145.

The lower cladding layer 111 and the upper cladding layer 113 are common to those four regions, 110 to 140. Moreover, the lower level of the amplifying layer 112, that of the active layer 122, that of the guiding layer 132, and that of the absorption layer 142, namely, the interface to the top of the lower cladding layer 113 coincide to the others and smoothly continue in all regions.

A plurality of the diffraction gratings 102a, which includes a corrugated interface between the lower cladding layer 111 and the grating layer 102, are formed in the SG-DFB region 120 and the CSG-DBR region 130. FIG. 3A collectively shows the diffraction grating as a region where each region includes a plurality of corrugations. The SG-DFB region 120 and the CSG-DBR region 130 includes a plurality of segments, where one segment includes one grating 102a and a space adjacent to the grating but without any gratings. In the present embodiment shown in FIGS. 3A and 3B, the SG-DFB region 120 includes five segments; while, the CSG-DBR region 130 includes seven segments. The diffraction grating is made of material with refractive index different from that of the lower cladding layer 111. In an example thereof, the grating layer 102 may be made of $In_{0.78}Ga_{0.22}As_{0.47}P_{0.53}$ when the lower cladding layer 111 is made of InP.

The common substrate 101 may be made InP. The guiding layer 132 in the CSG-DBR region 130 may be made of InGaAsP whose fundamental absorption edge corresponds to a wavelength shorter than the wavelength of the laser emission. For instance, the guiding layer 132 may have a bandgap wavelength of about 1.3 µm. The active layer 122 may be made of InGaAsP with an optical gain for a target emission wavelength. For instance, the active layer 122 may have the bandgap wavelength of about 1.57 µm. The amplifying layer 112 may control the magnitude of the emission by amplifying, or sometimes absorbing the light generated in the SG-DFB region 120. The amplifying layer 112 and the absorbing layer 142 in the OA region 140 may have the bandgap wavelength of about 1.57 µm which is substantially equal to that of the active layer. The amplifying layer 112 and the absorbing layer 142 may be made of semiconductor material with a substantial absorbing characteristic in wavelengths of the light emitted from the iTLD 100. The active layer 122, the amplifying layer 112 and the absorbing layer 142 may have the quantum well structure, where well layers made of $Ga_{0.47}In_{0.53}As$ with a thickness of 5 nm and barrier layers made of $Ga_{0.28}In_{0.72}As_{0.61}P_{0.39}$ with a thickness of 10 nm are alternately stacked. The amplifying layer 112 and the absorbing layer 142 may have the bulk configuration made of $Ga_{0.46}In_{0.54}As_{0.98}P_{0.02}$. These layers, 112 and 142, may be made of material same with that of the active layer 122. In such a combination, the manufacturing process of the iTLD 100 may be simplified because the active layer 122, the amplifying layer 112, and the absorbing layer 142 are formed at a time. The common substrate 101 may provide an electrode 105 in the back surface thereof. The electrode 105 extends in all four regions, 110 to 140.

Next, a method to select the emission wavelength of the iTLD 100 will be described.

First, we assume a structure where the tuning electrode 135b is removed. Referring to FIG. 4A, injecting a preset current into the DFB electrode 125a, the active layer 122 may generate photons. The SG-DFB region 120 provides the sampled grating. As already described, the sampled grating has a plurality of grating regions, in which a corrugated interface is formed, with the interval DS. FIG. 4A illustrates the grating regions A, and the other regions B put between the grating regions A. The other regions B have no corrugated interfaces. The reflection spectrum in the SG-DFB region 120 for the light generated therein becomes those shown in FIG. 4B. The interval DI may be determined by the effective refractive index of the active layer 122, that of the other region B, and the interval DI of the grating regions A.

On the other hand, the reflection spectrum of the CSG-DBR region 130 may be given by those shown in FIGS. 4C1 to 4C3. Specifically, the CSG-DBR region 130 also includes a plurality of segments including the grating region and the space region between the grating regions. Considering an arrangement of the single segment for an explanation sake, the assumed single segment provides, similar to the SG-DFB region 120, a plurality of grating region with a preset interval DS' but slightly different from the interval DS. Accordingly, interacting the SG-DFB region 120 with the single segment in the CSG-DBR region 130, a laser emission may occur at a wavelength where one of the peak wavelengths of the reflection spectrum of the SG-DFB region 120 and one of the peak wavelengths of the reflection spectrum of the single segment become equal to each other, where this mechanism to select the single wavelength is called as the Vernier Effect. In a case where no matching in the wave length occurs between the reflection peaks of the SG-DFB region 120 and those of the CSG-DBR region, the heater accompanied with the segments may change the optical properties of the segment; in particular, the heat may change the refractive index of the semiconductor material, which may vary the interval of the reflection peaks in the CSG-DBR region 130. Thus, the wavelength matching may be realized by the Vernier Effect. The CSG-DBR region 130 provides three segments, 130A to 130C. At least two segments among them have their specific intervals between the grating regions different from others. This arrangement is called as the Chirped Sampled Grating Distributed Bragg Reflector.

The iTLD 100 of the present embodiment may select the single wavelength thereof by the Vernier Effect described above. In other words, the Vernier Effect may be explained such that the SG-DFB region 120 supposes N reflection peaks in the predetermined wavelength region; while, the CSG-DBR region 139 supposes N+1 or N−1 reflection peaks in the same wavelength region, and the laser emission may occur at the wavelength where two peaks coincide. This mechanism automatically results in a situation where a plurality of wavelength conditions, in which two types of peak wavelengths coincide, appears as expanding the preset wavelength region. Two types of the peak wavelengths coincide at both ends of the preset wavelength region above.

Accordingly, the iTLD 100 of the present embodiment provides three segments in the CSG-DBR region 130, where they have their specific intervals between grating regions 102a, which are slightly different from others. Moreover, each of segments, 130A to 130C, provides their own heater, 136a to 136c. The iTLD 100 may select one of segments, 130A to 130C, dominantly affecting the emission wavelength thereof by adjusting the temperature distribution.

As shown in FIGS. 4C1 to 4C3, setting temperature distribution such that a region 130A closest to the SG-DFB region 120 becomes highest while the region 130C apart from the SG-DFB region 120 is relatively lower; the enveloped reflectance spectrum of the CSG-DBR region 130 may be enhanced in the first segment 130A relative to the other reflectance spectra. Accordingly, the emission wavelength may converge to the single wavelength existing in the region with relatively higher reflectance among the equivalent wavelengths set by the Vernier effect. Adjusting the temperature distribution in respective regions, 130A to 130C, as shown in FIGS. 4C1 to 4C3, the wavelength where the reflectance becomes the maximum may be adjusted in the enveloped reflectance spectrum. Moreover, adjusting the average temperature in respective regions, 130A to 130C, by heaters, the matched wavelength may be selected within respective wavelength ranges where the envelope of the reflectance spectrum is enhanced. Therefore, the combination of the SG-DFB region 120 with the CSG-DBR region 130 may tune the emission wavelength. The temperature distribution in the CSG-DBR region 130 may be easily adjusted by tuning the current supplied to the heaters, 136a to 136c.

Further referring to FIG. 3, the SG-DFB region 120 includes tuning regions 120B between the DFB regions 120A. The tuning region 120B includes the waveguide layer 122b instead of the active layer 122a and the tuning electrode 125b. Applying a bias voltage or a bias current to the tuning electrode 125b, the waveguide layer 122b in the tuning region 120B may change the equivalent refractive index thereof. Adjusting the bias current/voltage applied to the tuning electrode 125b, the emission wavelength roughly selected by the Vernier effect and the temperature in the CSG-DBR region 130 may be finely tuned so as to match with the ITU-T grid exactly.

The electrodes, 145, 135a to 135c, 125a, 125b and 115, are connected to respective biases independent to others. Supplying the current into the electrode 125a in the SG-DFB region 120, the active layer 122a may generate photons. Propagating in the layers 122a, 122b, and 132, and being reflected between the SG-DFB region 120 and the CSG-DBR region 130 reiteratively, the iTLD 100 may emit laser light with the tuned single wavelength. A portion of the laser light is amplified in the SOA region 110 and output outward. The absorption layer 142 in the OA region 140 may absorb light leaked through the CSG-DBR region 130. The current injected from the electrode 115 in the SOA region 110 may adjust the optical gain of the SOA region 112; accordingly, the auto-power control (APC) circuit often used in a control for a conventional LD may keep the power of the optical output from the iTLD 100 by monitoring a portion of the light output from the SOA region 110 and feed-backing the monitored result to the injection current.

The iTLD 100 is mounted on the TEC and the temperature of the TEC is kept substantially constant. The physical properties of a semiconductor material, in particular, the refractive index and the bandgap energy thereof, depend on the temperature. Even when the emission wavelength is determined by the Vernier effect described above, the fluctuation of the temperature of the device may shift the emission wavelength. Thus, the iTLD 100 of the present invention is preferable to be operated in a condition where the temperature thereof is kept substantially in constant.

The light whose wavelength is thus determined is externally extracted from the front facet, a side of the SOA region; while, the light entering the OA region 140 may be absorbed therein, and rest portion of light reaching rear facet is reflected toward the OA region 140 because of high reflectivity greater than 10% of the rear face and re-absorbed therein again. Thus, the light leaked from the rear facet becomes substantially zero or ignorable small enough. The iTLD 100 according to the present embodiment may suppress stray light emitted from the rear face thereof. It is preferable for an effective measure of the stray light to suppress the light leaked from the rear facet at least 1/100 or less compared to the light output from the front face. Because the rear face of the present embodiment shows the reflectivity thereof greater than 10%, it may also protect external light from entering within the iTLD 100. The reflectivity of the rear facet is further preferable to be greater 20%. The stray light entering the iTLD 100 from the rear facet is absorbed in the OA region 142, which may also suppress the stray light from entering the optical cavity, that is, the SG-DFB region 120 and the CSG-DBR region 130.

The optical modulator 200 will be described.

Figure 5:
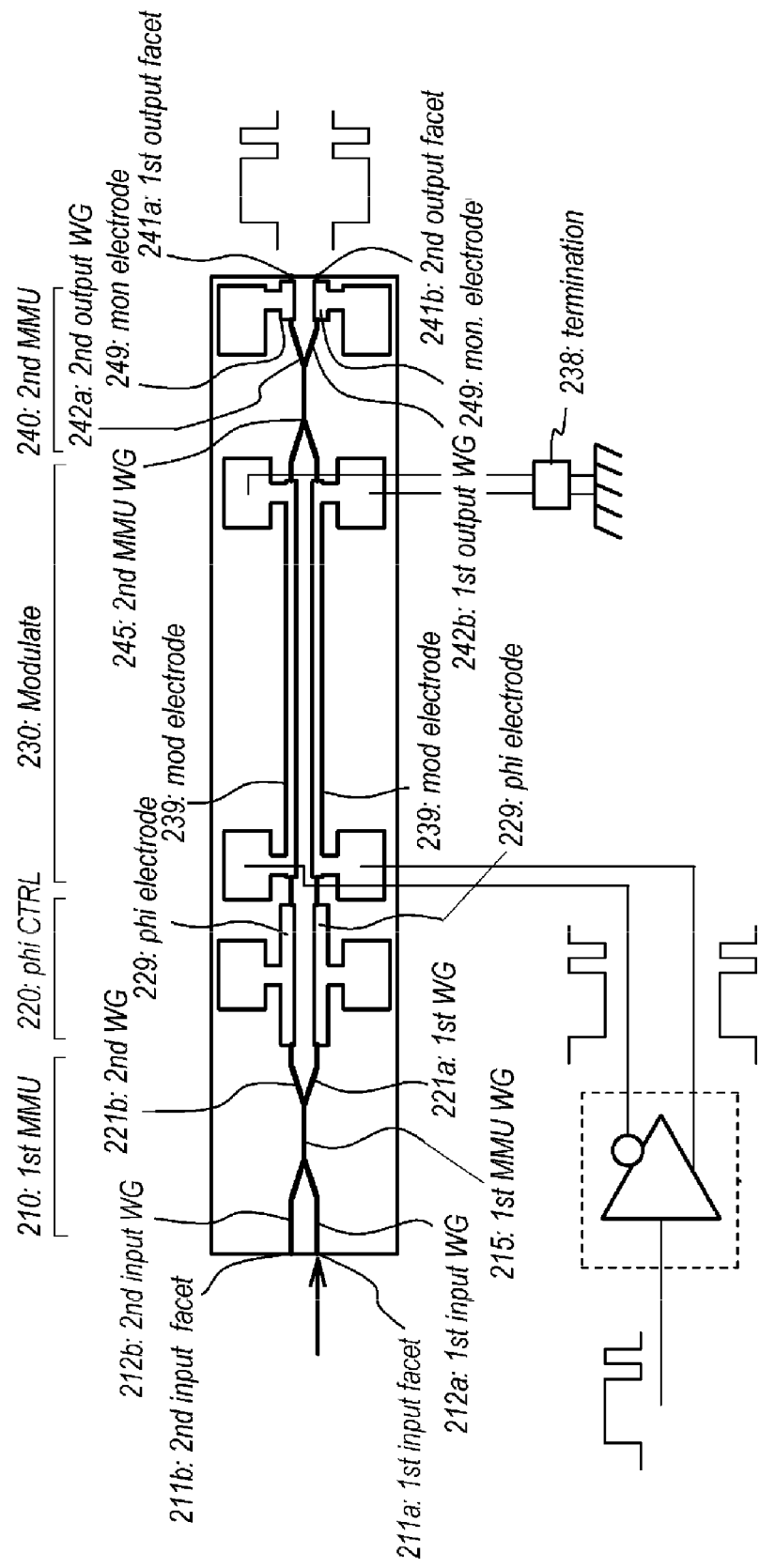
FIG. 5 is a plan view of a semiconductor optical modulator integrated with the tunable LD shown in FIGS. 3A and 3B.

FIG. 5 is a schematic plan view of the optical modulator 200 according to an embodiment of the invention. The optical modulator 200, which is a type of what is called the Mach-Zender modulator, includes the first coupling section 210, the phase adjusting section 220, the modulating section 230, and the second coupling section 240. The first coupling unit 210 provides the first input waveguide 212$a$ coupled to the first input port 211$a$ and the second input waveguide 212$b$ coupled to the second input port 211$b$. These two waveguides, 212$a$ and 212$b$, join at the first coupling waveguide 215, then divide into the first waveguide 221$a$ and the second waveguide 221$b$. Assuming that the axis of the optical modulator 200 extends along the longitudinal axis thereof, the first input waveguide 211$a$ and the first waveguide 221$a$ are arranged in the same side, while, the second input waveguide 211$b$ and the second waveguide 221$b$ are arranged in the same side.

The first and second waveguides, 221$a$ and 221$b$, meet at the second coupling waveguide 245, then divide into the first output waveguide 242$a$ coupled to the first output port 241$a$ and the second output waveguide 242$b$ coupled to the second output port 241$b$. The first output port 241$a$ and the second waveguide 221$b$ are arranged in the same side, while, the second output port 241$b$ and the first waveguide 241$a$ are arranged in the same side. The optical path length of the first waveguide 221$a$ is different from that of the second waveguide 221$b$ by a preset condition. For instance, the difference between the path length of the first waveguide 221$a$ and that of the second waveguide 221$b$ is set such that light propagating in two waveguides, 221$a$ and 221$b$, shows a phase difference of $-\pi/2$.

The first and second waveguides, 221$a$ and 221$b$, which are often called as an arm, provide an arm electrode that may adjust the phase of the light propagating therein. The arm electrode typically includes a phase adjusting electrode 229 and a modulator electrode 239, where they are apart to each other and electrically isolated. Positional relation between two electrodes, the phase adjustor electrode 229 and the modulator electrode 239, is not restricted to those shown in FIG. 5; the phase adjustor electrode 229 is arranged in a side close to the input port compared to the modulator electrode 239. Moreover, each of the first and second output waveguides, 242$a$ and 242$b$, provides a monitor electrode 244.

The modulator electrode 239 receives in one end thereof the modulation signal coming from the external driver circuit to modulate light propagating the first and second waveguides, 221$a$ and 221$b$. The other end of the modulator electrode 239 is connected to a termination resistor 238. Applying the modulation signal to the modulator electrode 239; the refractive index of the core 20 in the first and second waveguides, 221$a$ and 221$b$, varies to modulate the phase of the light propagating therein.

The external driver provides two signals complementary to the others, each of which is applied to the modulator electrode 239 of the first waveguide 221$a$ and that of the second waveguide 221$b$. That is, when the modulator electrode 239 of the first waveguide 221$a$ receives the signal with the level "1", the modulator electrode 239 of the second waveguide 221$b$ receives the signal with the level "0". Oppositely, when the modulator electrode 239 of the first waveguide 221$a$ receives the "0" level signal; the modulator electrode 239 of the second waveguide 221$b$ receives the signal with "1" level. Thus, the light propagating the first waveguide 221$a$ differentiates the phase thereof from that of the light propagating the second waveguide 221$b$ because of the voltage difference between the first and second waveguides, 221$a$ and 221$b$.

Further specifically, when the modulator electrode 239 of the first waveguide 221$a$ receives the signal with "1" level, while, that of the second waveguide 221$b$ receives the signal with "0" level, the light propagating the first waveguide 221$a$ causes the phase difference by $-\pi/2$ compared to that propagating the second waveguide 221$b$. On the other hand, when the signal with "0" level is applied to the modulator electrode 239 of the first waveguide 221$a$, while, the signal with "1" level is applied to the modulator electrode 239 of the second waveguide 221$b$, the phase difference by $+\pi/2$ is caused between the light propagating respective waveguides, 221$a$ and 221$b$.

As previously described, the optical path length of two waveguides, 221$a$ and 221$b$, has the difference corresponding to the phase shift by $-\pi/2$. Accordingly, when the modulation signals applied to the modulator electrode 239 cause the phase difference of $-\pi/2$ between the light propagating respective waveguides, 221$a$ and 221$b$, the phase difference between the light at the end of respective waveguides, 221$a$ and 221$b$, become $-\pi$, which outputs the light at the first output port 241$a$ but vanishes at the second output port 241$b$. On the other hand, when the modulating signal causes the phase difference of $+\pi/2$ between the light propagating respective waveguides, 221$a$ and 221$b$, the phase difference between the light at the end of respective waveguides, 221$a$ and 221$b$, disappears, which vanishes light at the first output port 241$a$ but outputs from the second output port 241$b$.

Thus, depending on the phase difference between the light propagating in the first waveguide 241$a$ and that propagating in the second waveguide 241$b$; the port from which the light input from the first input port 211$a$ is extracted changes between two output ports, 241$a$ and 241$b$. The light output from the first output port 241$a$, or that from the second output port 241$b$ may be modulated. The embodiment shown in FIG. 5 extracts the modulated light from the first output port 241$a$.

Practically, the optical path length of the first and second waveguides, 241$a$ and 241$b$, is not always coincident with those designed values. Process instability for manufacturing the waveguides, 241$a$ and 241$b$, often causes the scattering of the device parameters. Accordingly, the phase difference of the light propagating in respective waveguides, 241$a$ and 241$b$, does not always show $-\pi/2$ without any bias signals to the modulator electrode 239. The phase adjust electrode 229 may adjust the phase of the light under a condition when no bias is applied to the modulator electrode 239.

Specifically, applying a DC voltage to the phase adjustor electrode 229, the phase propagating respective waveguides, 221$a$ and 221$b$, may be statistically adjusted. That is, the DC voltage applied to the phase adjustor electrode 229 may be fed back from the optical output monitored by the monitoring electrode 249. The output waveguides, 242$a$ and 242$b$, arranged beneath the monitoring electrode 249 may operate as a photodiode. A portion of the light propagating in the output waveguides, 242$a$ and 242$b$, may be converted to the photocurrent Ipd, and the voltage converted from the photocurrent Ipd into the voltage signal may be fed back to the phase adjustor electrode 229. When the phase difference between the light propagating the first output waveguide 241$a$ and that in the second output waveguide 241$b$ is zero or $-\pi$, the intensity of the light output from the first output port 241$a$ and that from the second output port 241b become equal to the others. Accordingly, the phase adjustor circuit adjust the voltage applied to the phase adjustor electrode 229 such that the intensity of the light output from the first output port 241a and that from the second output port 241b become equal to the others. Thus, the phase of the light propagating in respective waveguides, 241a and 241b, becomes 0 or −π under no modulating signal is applied to the modulator electrode 239.

The optical transceiver according to an embodiment of the present invention installs a TOSA that provides the iTLD 100 thus described. Next, details of the TOSA will be described.

Figure 6:
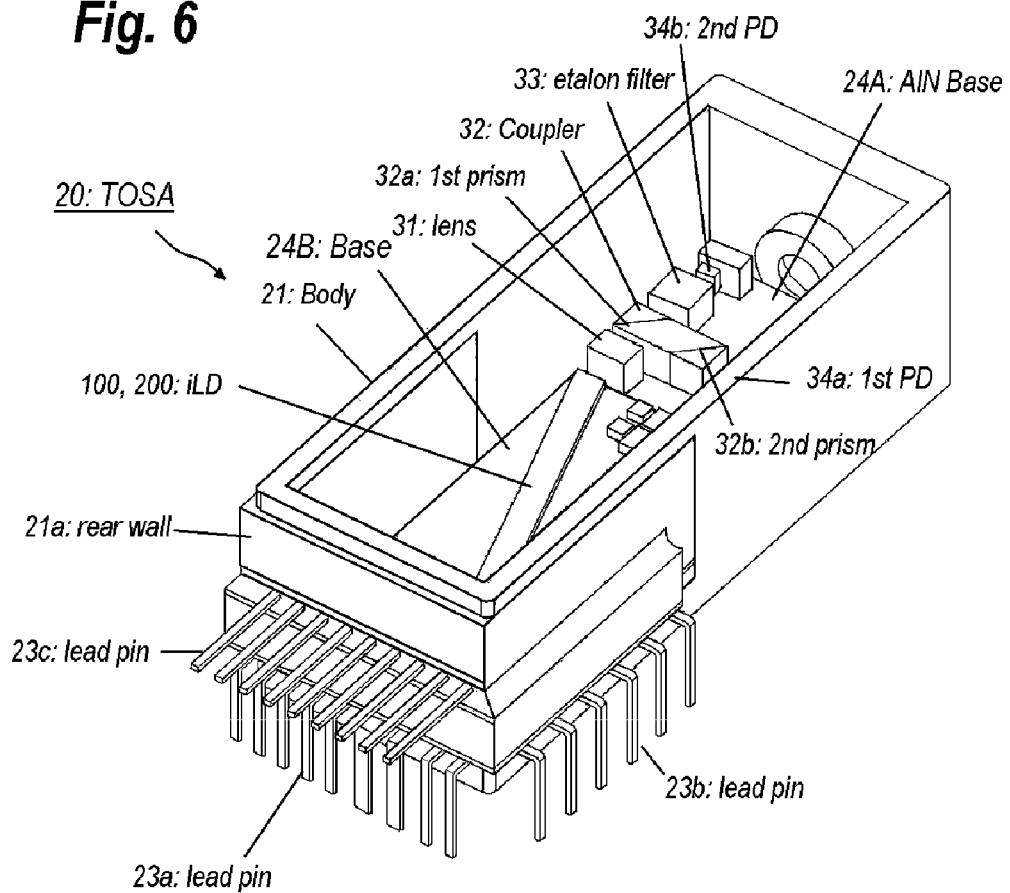
FIG. 6 is a perspective view of an inside of the TOSA that installs the iTLD according to the present invention.

FIG. 6 shows an inside of the TOSA 20 to be installed within the optical transceiver of the present embodiment. The TOSA 20 shown in FIG. 6 includes a body 21 with a box shape and a coupling portion 22 protruding from one side wall of the box body 21. FIG. 6 omits the coupling portion 22.

Total eighteen (18) lead pins, 23a and 23c, extend from the rear wall 21a of the box body 21. These lead pins, 23a and 23c, are arranged in two rows; while other six (6) lead pins 23b are extrude from one side wall of the box body 21. The upper arrays of the lead pins 23c arranged in the rear wall are provided for transmitting high frequency signal to drive the optical modulator 200 and for providing heater currents in the CSG-DBR region 130, where they are arranged for providing signals directly to the iTLD 100. The lower array of lead pins, 23a and 23c, and those 23b in the side wall are provided for transmitting signals to the modulator 200 but except for those to driver the modulator 200 and signals to the iTLD 100 except for the heater; that is, the latter group of lead pins, 23a to 23c, are provided for transmitting signals with low frequency components or DC signals. The box body 21 of the TOSA 20 may be made of metal but a portion from which those lead pins, 23a to 23c, are extracted, are made of ceramics to secure the electrical isolation to the meal body. The lead pins 23c to transmit the high frequency signals are impedance-matched to suppress the degradation of the signal quality.

The iTLD 100 integrated with the modulator 200 is mounted on the TEC 24. A feature of the TOSA 20 of the present embodiment is that the longitudinal direction of the TEC is aligned with the longitudinal direction of the box housing 21 but the iTLD 100 is diagonally mounted on the TEC 24. That is, the optical axis of the light output from the modulator 200 has a specific angle to the light emitting face thereof except for a right angle, specifically, the optical axis of the iTLD 100, equivalently of the modulator 200, is inclined with the normal of the light emitting face thereof. Accordingly, even the light emitted from the modulator 200 is externally reflected and returns the modulator 200, the reflected light may not back to the active layer 122a of the iTLD 100 and cause any optical noise.

The light emitted from the modulator 200 is condensed by the first lens 31 and enters the first optical coupler 32. The optical coupler divides the light by the first prism 32a, where two beams are not necessary to be equally divided. One of the light beams enters the etalon filter 33 and is received by the second PD 34b; while, the other light beams advances the first PD 34a. The first PD 34a is hidden by the side wall of the box body 21. The light beam heading the first PD 34a is divided again by the second prism 32b, where one of divided light beams heads the firs PD 34a while the other of the light beams heads the optical coupling portion 22. That is, in the optical coupling system shown in FIG. 6, the first PD 34a detects the raw light output from the modulator 200, while, the second PD 34b detects the light modulated by the etalon filter 33. Moreover, the light reaching the optical coupling portion 22 has the zigzag optical axis bent twice by two prisms, 32a and 32b. The etalon filter 33 has the periodic transmittance with respect to the wavelength, and the period of the transmittance roughly corresponds to a span between grids of the DWDM optical communication system. Then, controlling the temperature of the iTLD 100 with the modulator 200 based on the output of the second PD 34b, the emission wavelength of the iTLD 100 may be aligned with one of the ITU-T grids. The optical components, 31 to 34, are arranged on the TEC 24 and respective temperatures may be precisely controller by the TEC 24. Two PDs, 34a and 34b, are mounted on the TEC 24 through respective sub-mounts 35a and 35b.

Figure 7:
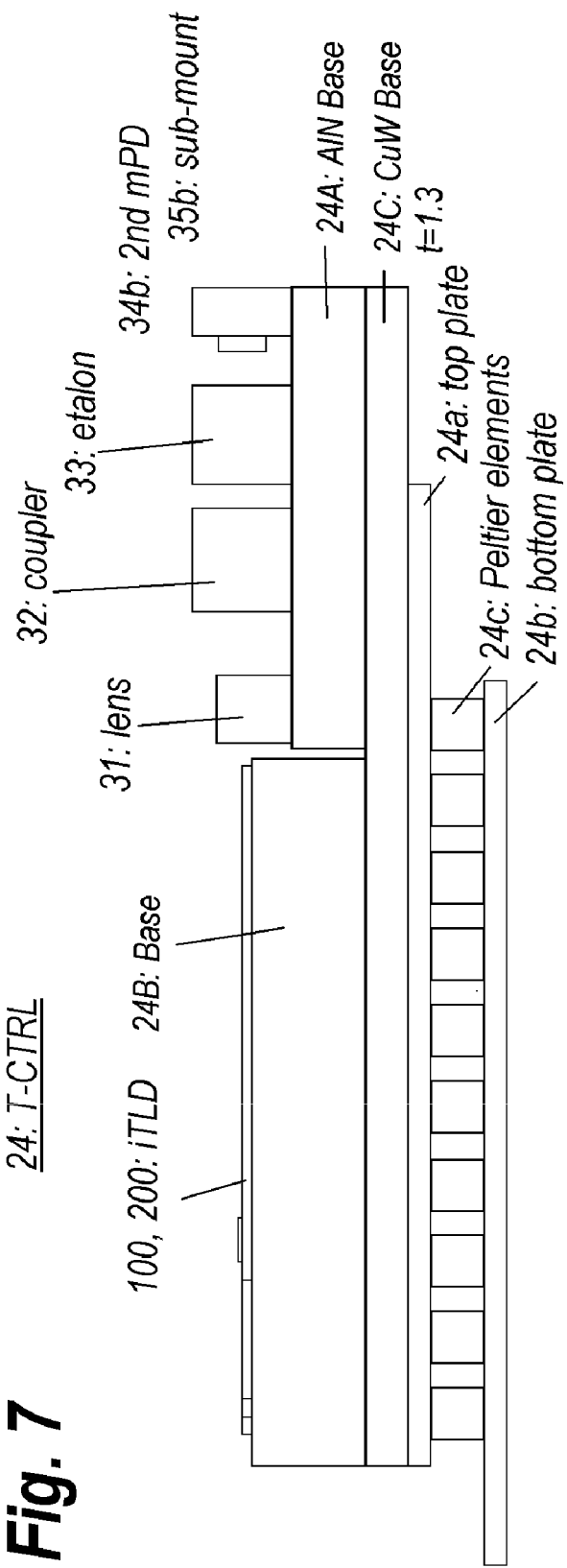
FIG. 7 is a side view of the iTLD mounted on the TEC.

FIG. 7 is a cross section showing the TEC 24 and components mounted on the TEC 24. The TEC 24 provides a Peltier device, the base 24C made of CuW, and other two bases 24A and 24B, where the former base 24A is made of aluminum nitride (AlN). The Peltier device 24 includes an upper plate 24a, a lower plate 24b and a plurality of Peltier elements 24c put between to plates, 24a and 24b. The Peltier elements are electrically connected in series. The upper plate 24a mounts the CuW base 24C so as to extend from a portion the iTLD 100 is mounted to another portion where rest optical components are mounted. The latter portion of the TEC 24 mounts the components 31 to 34 through the CuW base 24C and AlN base 24A. The former portion mounts the iTLD 100 with the modulator 200 through the CuW base 24C and another AlN base 24B. The upper plate 24a of the TEC 24 supports a portion of the optical components.

Moreover, the Peltier elements 24c are arranged only in an area where the iTLD 100 is mounted thereon. The other area where the optical components, 31 to 34, are arranged has no Peltier element 24c, because, the characteristics of the optical components, 31 to 34, are dull to the temperature thereof, while, that of the iTLD 100 and the modulator 200 are so sensitive. The iTLD 100 and the modulator 200 are necessary to be precisely controlled in the temperature thereof. In another aspect, a price of the Peltier device 24 strongly depends on a size thereof. The arrangement of the present embodiment where the area mounting the iTLD 100 with the modulator 200 only provides the Peltier device 24 may show a cost merit. The control of the temperature in the rest area where the optical components, 31 to 34, are mounted may be carried out by setting thickness of the CuW base to be thick about 1.3 mm. Moreover, an arrangement where the upper plate only supports the area where the iTLD 100 with the modulator 200 is mounted, but, the arrangement of the present embodiment where the upper plate 24a of the TEC 24 is extended to an intermediate area where the optical components, 31 to 34, are mounted thereof, may secure a strength necessary to support the rest area. Although a modified arrangement, where the upper plate 24a does not support the rest area but sustains the iTLD 100 with the modulator 200, may secure the temperature performance necessary for the optical components, 31 to 34, by providing the CuW base 24C thereunder. However, the upper plate 24a is preferable to be extended to the intermediate portion of the rest area from a viewpoint of the strength brought thereto. Another arrangement where the upper plate 24a fully supports the rest area for the optical components, 31 to 34, not only raises the cost of the TEC 24 but influences the temperature performance of the iTLD 100 with the modulator 200. The upper plate 24a extended to the rest area may operate as a heat spreader and the power consumption of the TEC 24 increases.

Figure 8:
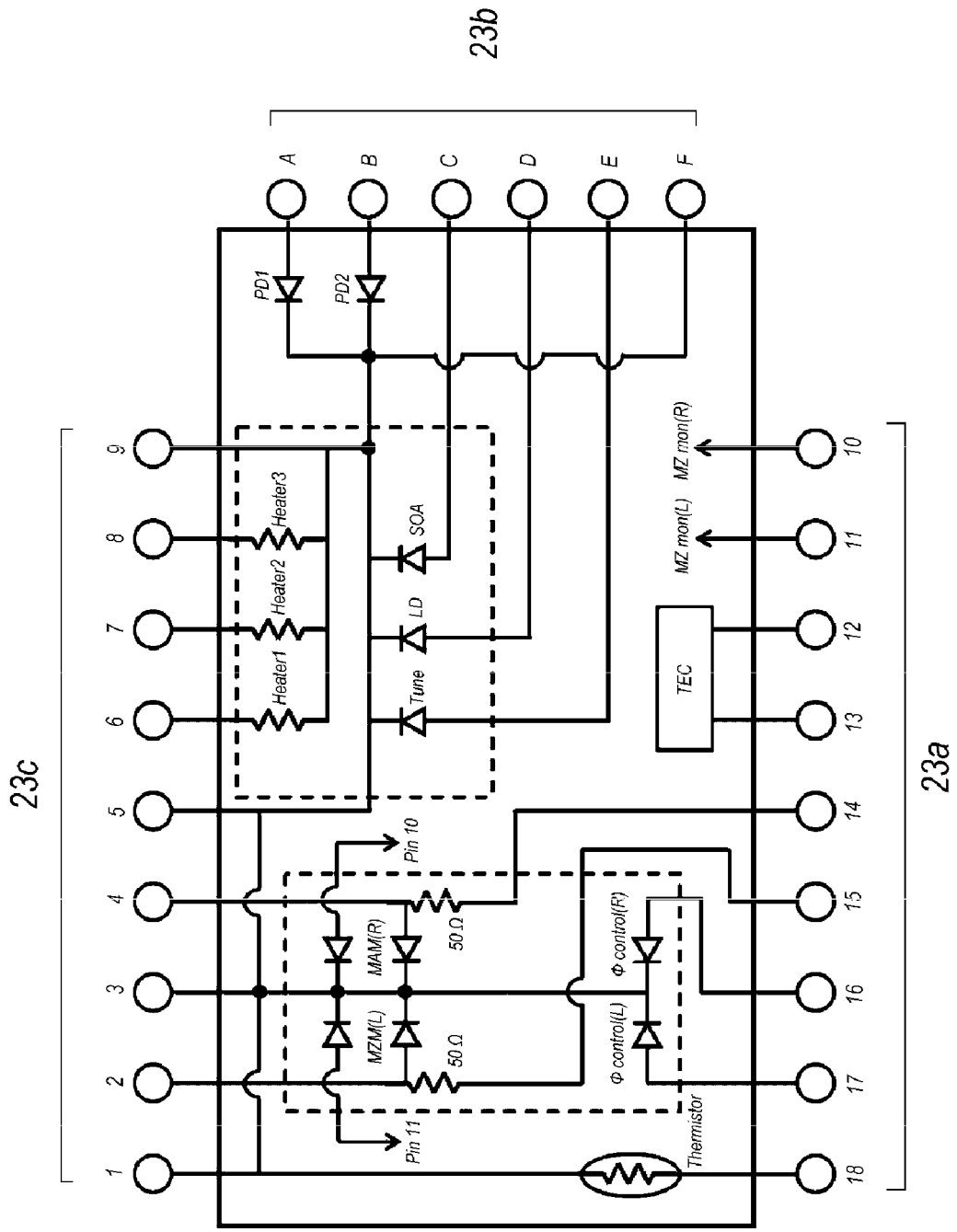
FIG. 8 is a connection diagram of the iTLD according to the present invention.

FIG. 8 schematically shows pin connections of the TOSA 20, that is, interconnection of respective pins, 23a to 23c, in the TOSA 20. As already described, the TOSA 20 according to the present embodiment provides total 24 lead pins, 23a to 23c. The lead pins 23c in the rear wall provides two driving signals (23c-2 and 23c-4) to driver the modulator 200 and three control signals (23c-6 to 23c-8) for the heaters. Because two driving signals (23c-2 and 23c-4) contain high frequency components reaching or sometimes exceeding 10 GHz, two signal pins (23c-2 and 23c-4) accompany with signal ground pins (23c-1, 23c-3 and 23c-5) in both sides thereof, which may simulate the impedance matching of the signal pins (23c-2 and 23c-4).

Some lead pins 23b are extracted from the side wall of housing, where they includes those for two monitoring signals (23b-A and 23b-B) and those for currents to three regions of the iTLD 100 (23b-C to 23b-E). Signals transmitting in these lead pins, 23a-A to 23a-F, are a DC signal or a substantially DC signal including very low frequency components. Accordingly, the lead pins 23b are unnecessary to take the impedance condition of the lead pin itself and the wiring connected thereto into account. The lower array of the lead pins 23a, which are extracted from the rear all, correspond to those, 23a-12, 23a-13 and 23a-18, to control the TEC 24, and those, 23a-10, 23a-11, 23a-14 to 23a-17, for the modulator 200 except for the high frequency signal. These signals are also DC or substantially DC signal without taking the impedance condition thereof into account. The lead pins, 23a-12 and 23a-13, for supplying the current to the TEC 24 flow a large current therein, the parasitic resistance thereof should be rather considered.

Next, an arrangement how to provide signals to the TOSA 20 according to the present invention will be described.

Figure 9:
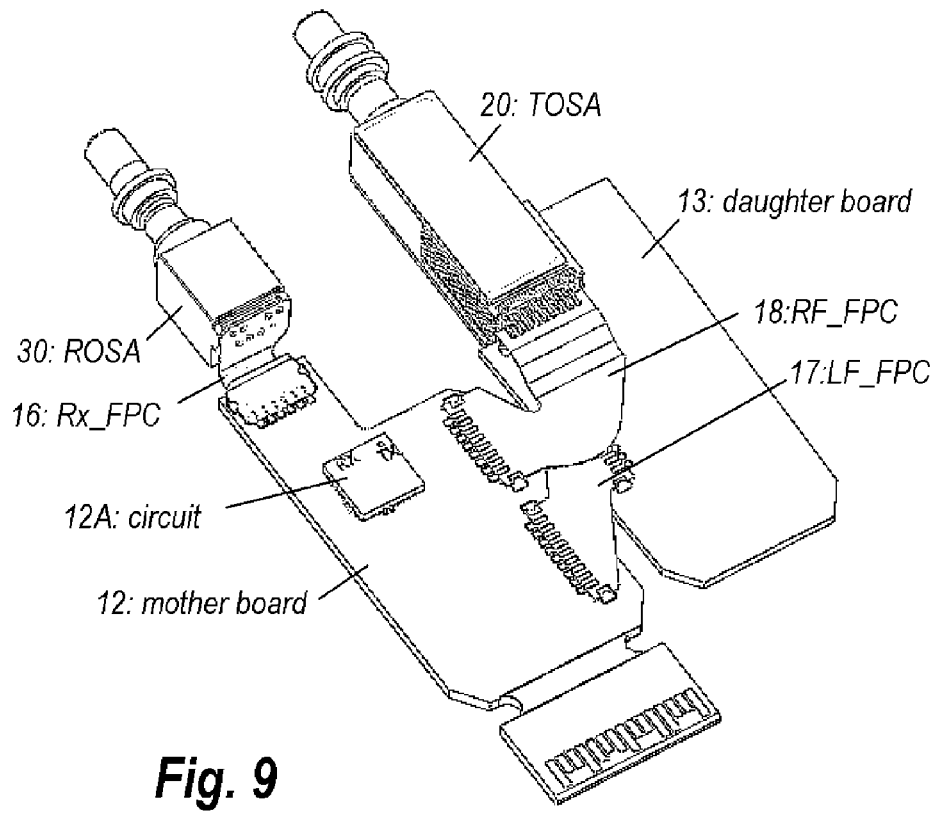
FIG. 9 shows an intermediate product that assembles two circuit boards, three FPC boards, and two OSAs.

FIG. 9 is a perspective view showing the TOSA 20, the ROSA 30, two circuit boards, 12 and 13, and two flexible printed circuit (hereafter denoted as FPC) boards, 17 and 18, where they are installed within the optical transceiver 1. As shown FIG. 9, the first FPC 16 connects the ROSA 30 with the mother board 12, which is hereafter called as Rx_FPC 16. The Rx_FPC 16 transmits signals, D-Rx and /D-Rx, complementary to each other from the ROSA 30 to the mother board 12, while, other signals of a power supply Vcc and the bias Vpd for the PD in the ROSA 30 from the mother board 12 to the ROSA 30. The power supply is for the pre-amplifier installed within the ROSA 30. The optical transceiver 1 according to the present invention installs an avalanche photodiode (APD) in the ROSA 30 as a light receiving device. The APD is necessary to be biased with relatively high voltage reaching scores of volts. The ROSA 30 may install a variable optical attenuator (hereafter denoted as VOA) therein. The Rx_FPC 16 may transmit signals to control the VOA, specifically, to set the attenuation degree of the VOA.

The TOSA 20, as already described, provides two types of lead pins, 23a to 23c, namely, those for the high frequency signals 23c and for DC or low frequency signals, 23a and 23b. The former group of lead pins 23c is soldered to an end of a FPC 18, which is hereafter called as the RF_FPC, and the other end of the RF_FPC 18 is directly connected to the mother board 12. The other groups of lead pins, 23a and 23b, are directly soldered to the daughter board 13. The signals transmitted through the latter groups of lead pins, 23a and 23b, are partially processed on the daughter board 13 and transmitted to the mother board 12 through another FPC 17, which is hereafter called as LF_FPC. Thus, the optical transceiver 1 according to the present embodiment transmits high frequency signals from the circuit 12A on the mother board 12 directly to the TOSA 20 through the RF_FPC 18, while, the DC or low frequency signals are linked with the TOSA 20 through the LF_FPC 17 and the interconnections on the daughter board 13. The arrangement to carry the high frequency signals from the mother board 12 directly to the TOSA 20 as bypassing the daughter board 13 may suppress the degradation of the signal quality.

Figure 10:
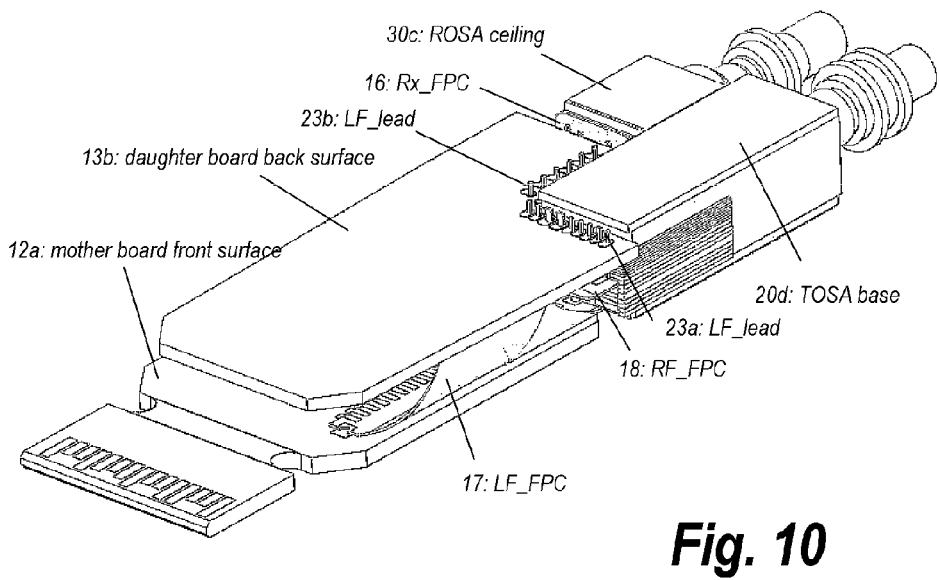
FIG. 10 shows a perspective view of the intermediate product shown in FIG. 9, where two circuit boards are set in an up-and-down relation.

FIG. 10 shows an arrangement where the two boards, 12 and 13, and two OSAs, 20 and 30, and three FPCs, 16 to 18, are assembled within the housing of the optical transceiver 1. The two boards, 12 and 13, are arranged in up-and-down relation by bending the LF_FPC 17 and the RF_FPC 18. The TOSA 20 does not interfere with the ROSA 30 because the TOSA 20 is arranged in a forward space of the mother board 12 and in the side of the ROSA 30. The base of the ROSA 30 is set downward, while, the base 20d of the TOSA is set upward. Assembling the intermediate product shown in FIG. 10 within the housing of the optical transceiver 1, the base 20d of the TOSA 20 comes in contact with the ceiling of the housing; while, the base of the ROSA 30 comes in contact with the bottom of the housing. The TOSA 20 and the ROSA 30 each installs devices to generate heat, for instance, the TEC 24 in the TOSA 20 and the pre-amplifier in the ROSA 30 and these devices are mounted on respective bases, the thermal isolation between the TOSA 20 and the ROSA 30 may be substantially carried out.

The iTLD 100 is a semiconductor light-emitting device having an emission wavelength very sensitive to a temperature thereof. Accordingly, the thermal isolation between the ROSA 30 and the TOSA 20 becomes substantial for the performance of the tunable optical transceiver. Moreover, the mother board 12 mounts a signal processing circuit 12A thereon by the surface mounting technique and this circuit 12A generates large heat, but, the mother board 12 in the back surface thereof eliminates any members to dissipate heat of the circuit 12A. The top surface of the circuit 12A faces the primary surface of the daughter boar 13 when two boards, 12 and 13, are arranged in un-and-down position. But the primary surface of the daughter board 13 mounts other circuits for the TOSA 20 and provides no members to dissipate heat of the circuit 12A on the mother board 12. Thus, no heat-dissipating paths exist for the circuit 12A. Only the lead pins of the circuit 12A conduct heat from the circuit 12A to the mother board 12. Such an arrangement around the circuit 12A may thermally isolate the TOSA 20 from the circuit 12A.

Figure 11:
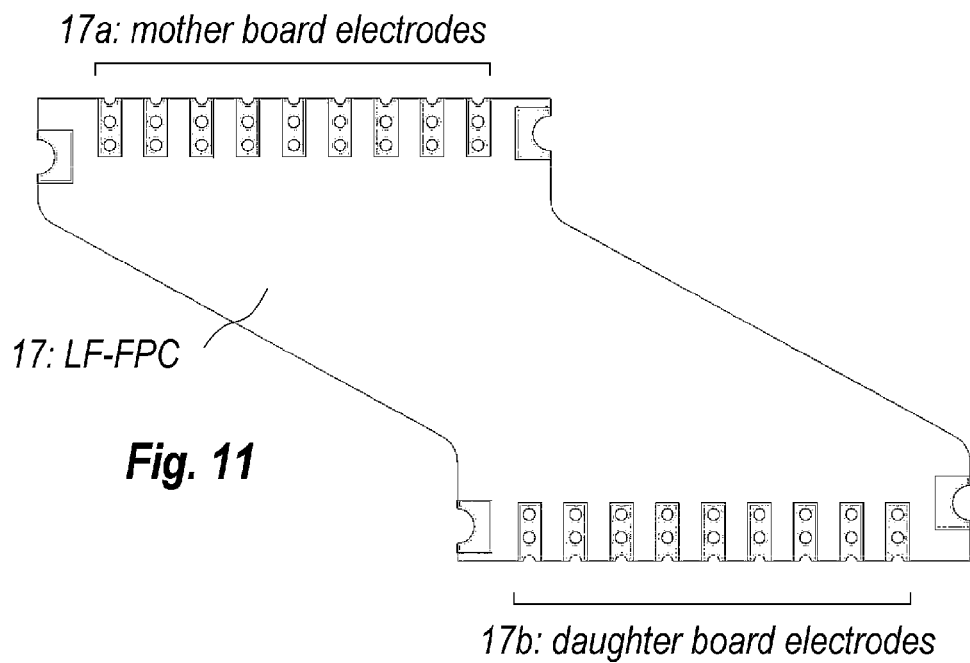
FIG. 11 is a plan view of the LF-FPC board that connects two circuit boards.

FIG. 11 is a plan view of the LF_FPC 17 which provides electrode 17a in a side of the mother board 12 and another electrode 17b in another side of the daughter board 13 in diagonal positions to each other. The diagonal arrangement of the electrodes in the LF_FPC 17 may prevent two boards, 12 and 13, connected to the LF_FPC 17 from being arranged in a twisted relation. Two boards, 12 and 13, arranged in respective positions twisted to each other not only makes it hard to install the boards, 12 and 13, but causes a stress to the RF_FPC 18 when they are forced to be installed, which affects the quality of the high frequency signals transmitted on the RF_FPC 18.

Figure 12:
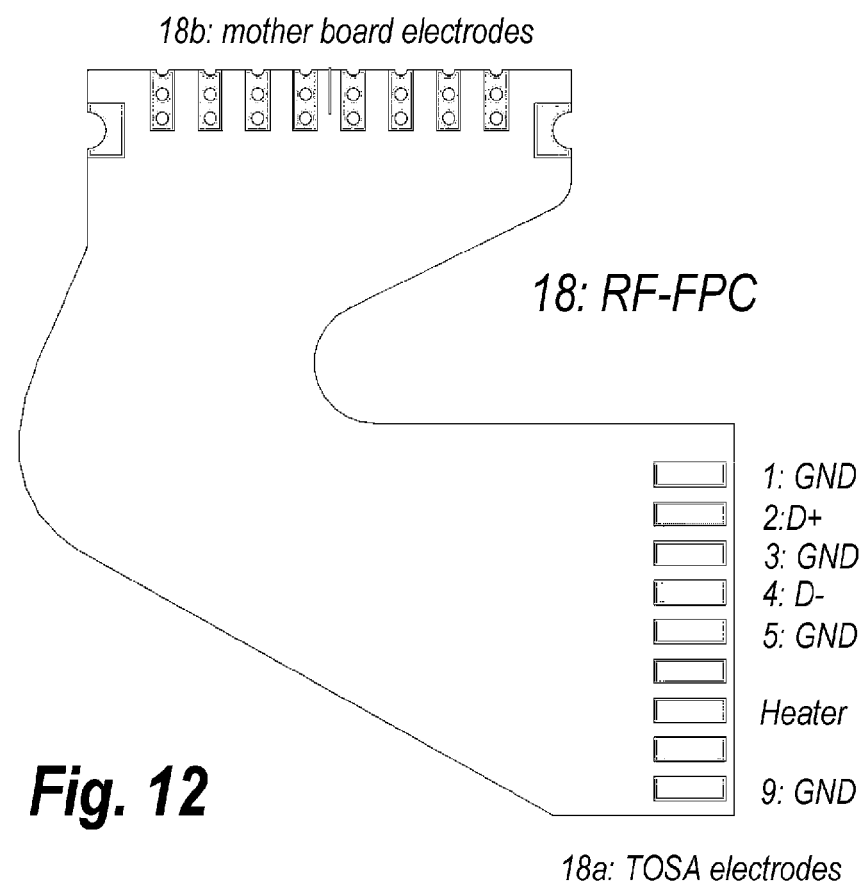
FIG. 12 is a plan view of the RF-FPC board that connected the TOSA directly to the circuit board that mounts the driving circuit thereon.
Figure 13:
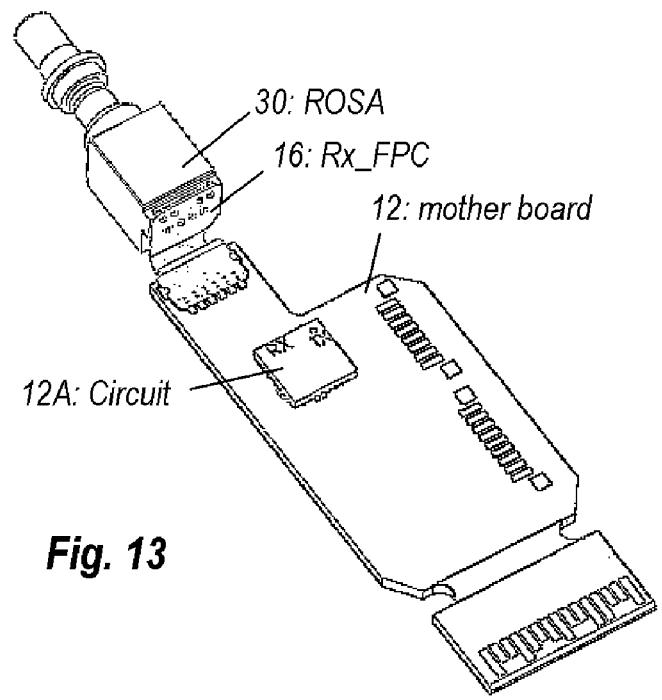
FIG. 13 shows a process to assemble the ROSA with the first circuit board.

FIG. 12 is a plan view of the RF_FPC 18. Two signal lines, D+ and D−, three heater lines, and four ground lines run on the RF_FPC 18. Two signal lines, D+ and D−, head from the electrodes 18a in the TOSA side to the other electrodes 18b in the side of the mother board 12 as being put between the ground lines. The RF_FPC 18 is pinched in an intermediate portion thereof and bent there. The pinched portion makes it easy to be bent thereat to realize the up-and-down arrangement of two boards, 12 and 13. The signal lines, D+ and D−, run inner side at the pinched portion to connect the TOSA 20 with the mother board 12 in shortest. The heater lines may be arranged in outer side at the pinched portion because they transmit signals with relatively lower frequency.

The optical transceiver 1 according to the present embodiment, the high frequency signals provided for the TOSA 20 are generated in the circuit 12A mounted on the mother board 12, and are transmitted directly to the TOSA 20 on the RF_FPC 18 without passing through the daughter board 13. Such arrangement may not only shorten the absolute distance for carrying the high frequency signals but prevent the signals from degradation by discontinuities of the transmitting medium between the boards, 12 and 13, and the LF_FPC 17, which causes the impedance mismatching. Moreover, the LF_FPC 17 connects two boards, 12 and 13, in a diagonal position. This arrangement makes the interconnection on the LF_FPC 17 longer, but effectively prevents two boards from being arranged in the twisted relation.

Next, a process to assemble two OSAs, 20 and 30, and two boards, 12 and 13, using two FPCs, 17 and 18, will be described.

First, the Rx_FPC 16 connects the mother board 12, on which the circuit 12A is mounted, with the ROSA 30. Passing the lead pins of the ROSA 30 through respective biases provided in the Rx_FPC 16, while, soldering electrodes in the side opposite to the ROSA 30 with the electrodes provided in the mother board 12, the ROSA 30 may be coupled with the mother board 12.

Figure 14:
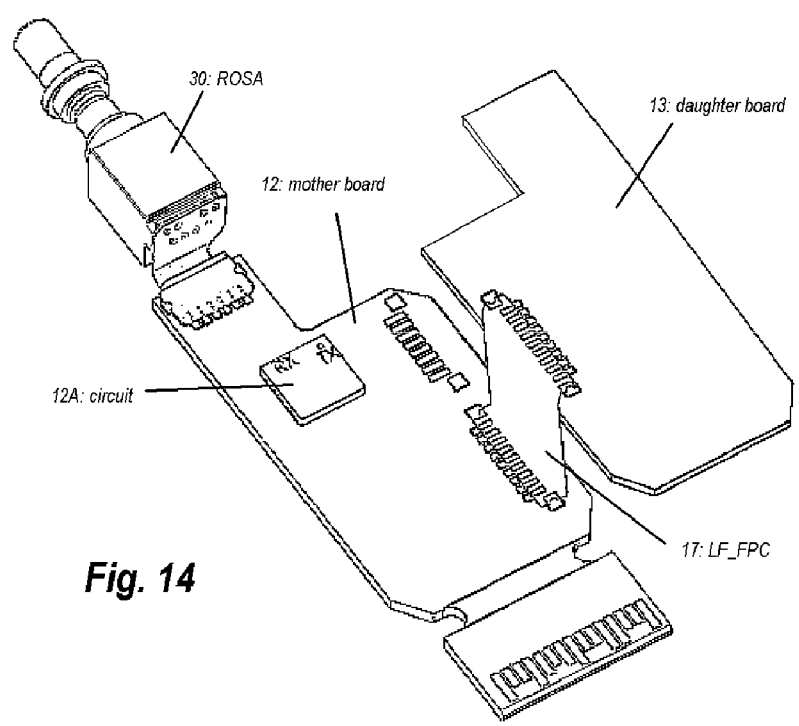
FIG. 14 shows a process to assemble the second circuit board with the first circuit board that is assembled with the ROSA.
Figure 15:
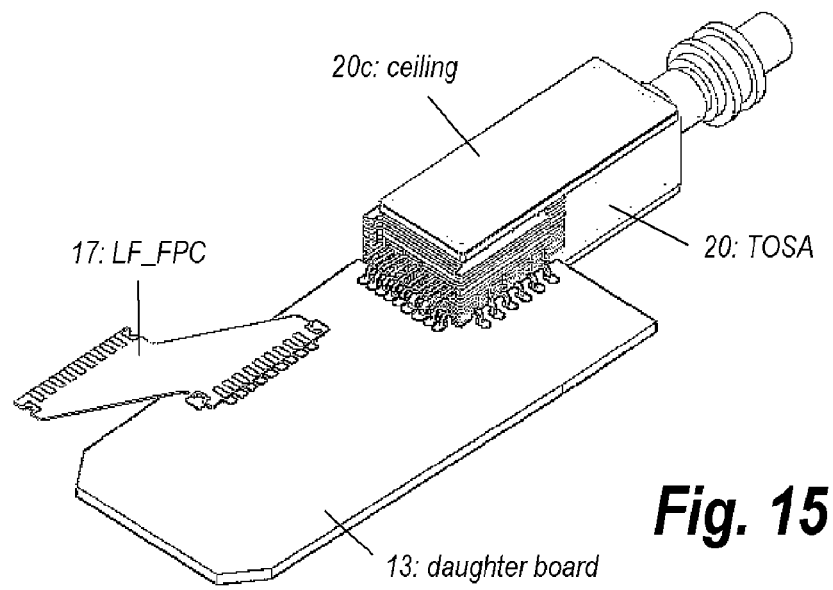
FIG. 15 shows a process to mount the TOSA on the second circuit board.

Next, the LF_FPC 17 connects the daughter board 13 with the mother board 12 by conventional soldering technique, which is shown in FIG. 14. Further, lead pins, 23a and 23b, of the TOSA 20 for the DC or the low frequency signals are passed through the biases in the daughter board 13 and soldered at the land around the via, as shown in FIG. 15. FIG. 15 omits the ROSA 30 and the mother board 12. Processes of the soldering above described, namely, that for the ROSA 30 and that for the TOSA 20 may be carried out in the same time; that is, disposing devices including the TOSA 20 and the ROSA 30 in respective positions, one time soldering may assemble those devices except for the RF_FPC 18.

Figure 16:
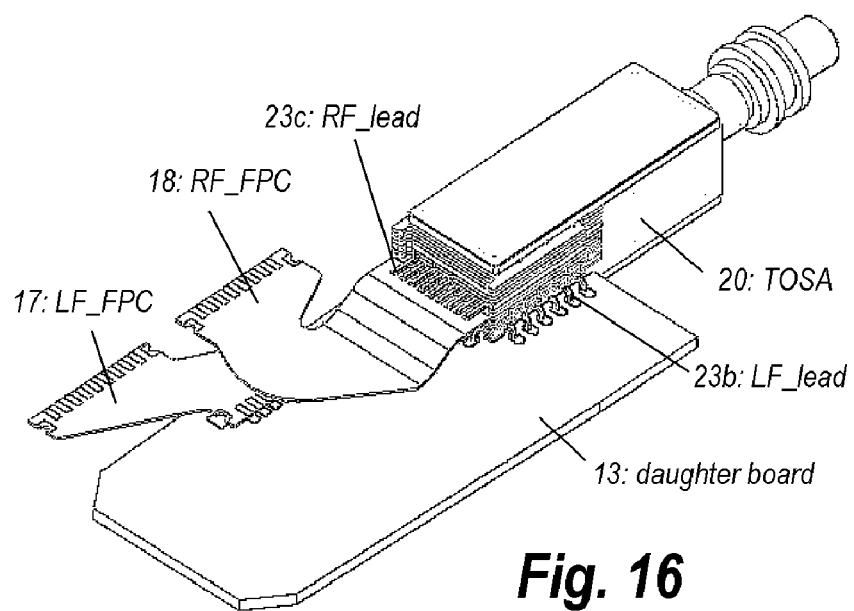
FIG. 16 shows a process to solder the RF_FPC with the lead pins of the TOSA.

Next, the lead pins 23c of the TOSA 20 are soldered with the RF_FPC 18 by the spot welding as shown in FIG. 16. FIG. 16 also omits the mother board 12 and the ROSA 30. In this state, the RF_FPC 18 is connected to the TOSA 20 in one end thereof, but, the other end is still opened. Then, the other end of the RF FPC 18 is soldered with the electrode on the mother board 12 by the spot welding or the like.

Figure 17:
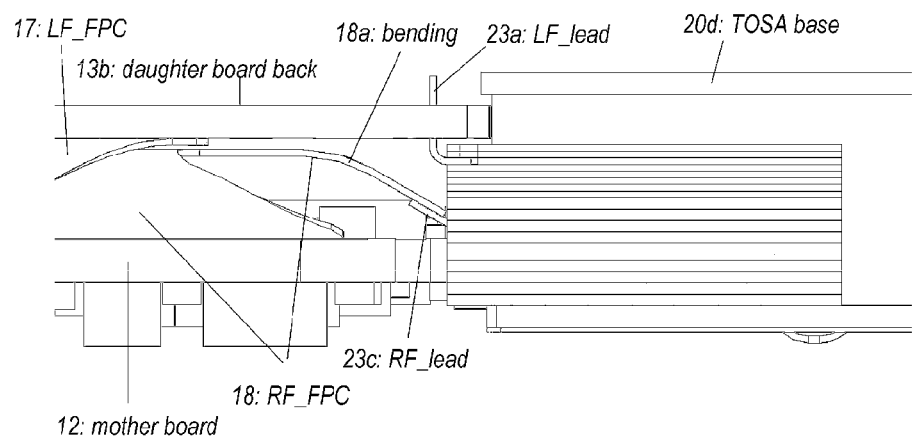
FIG. 17 magnifies a portion of the RF_lead provided in the rear wall of the TOSA.

Lastly, bending the LF FPC 17 and the RF_FPC 18 so as to overlap the daughter board 13 with the TOSA 20 with the mother board 12, two boards, 12 and 13 are set in the up-and-down arrangement. Bent FPC boards, 17 and 18, may enhance the reliability of the soldering of the electrodes because stress to push the FPC, 17 and 18, against the boards, 12 and 13, is caused. FIG. 17 is a cross section showing the condition of the connection between the RF_FPC 18 and the lead pins 23c of the TOSA 23. The lead pins 23c are bent downward at the soldering thereof, and the RF_FPC 18 levelly extends at a position 18a facing the daughter board 13, which may enlarges a bent radius of the RF_FPC 18 and suppress the degradation of the quality of the high frequency signals carried on the RF_FPC 18. The RF_FPC 18 is broken depending on a primary material thereof for a smaller bent radius. The lead pins 23c formed downward may enhance the reliability of the RF_FPC 18.

Figure 18:
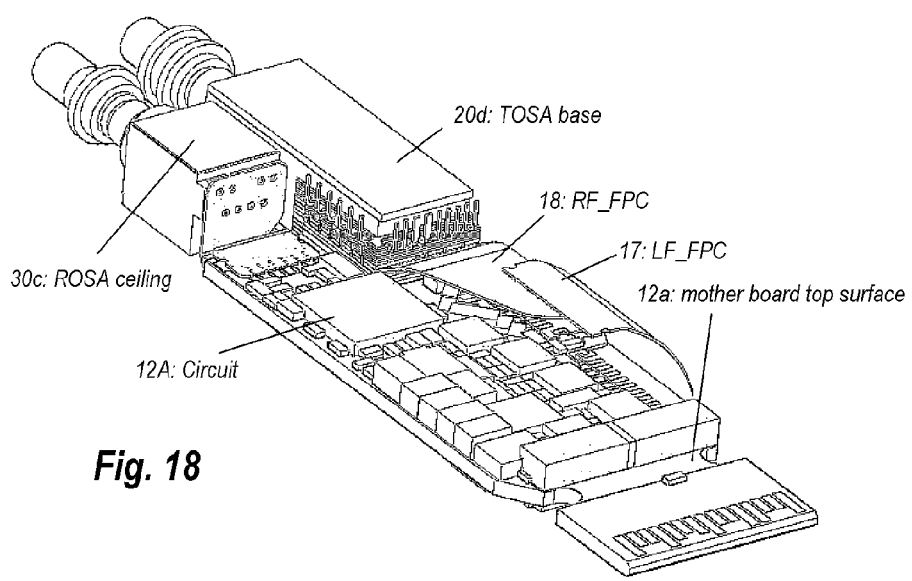
FIG. 18 is a perspective view of the intermediate product, where the second circuit board is removed to show the surface of the first circuit board.

FIG. 18 is a perspective view of the OSAs, 20 and 30, and two FPCs, 17 and 18, where they are thus assembled to each others. FIG. 18 omits the daughter board 17 to show the arrangement of the surface of the mother board 12. Referring to FIG. 2 again, FIG. 2 shows an inside of the optical transceiver 1 into which two OSAs, 20 and 30, and two boards, 12 and 13, are installed. As described above, the optical transceiver 1 according to the present embodiment installs, in addition to the signal processing circuit 12A, a plurality of power supplies to control the iTLD 100. Accordingly, not only the mother board 12 but the daughter board 13 is necessary to mount many electronic components in respective surfaces thereof, 12a, 12b, 13a and 13b, in a tightly packed arrangement. Because two boards, 12 and 13, are arranged in the up-and-down position, FIG. 18 explicitly shows the base 20d of the TOS 20 and the ceiling 30c of the ROSA 30, while, FIG. 19 shows the ceiling 20c of the TOSA 20 and the base 30d of the ROSA 30. Respective bases, 20d and 30d, come in contact with the upper housing and the lower housing, which forms two heat dissipating path independently. The circuit 12A mounted on the top surface of the mother board 12 does not have substantial heating paths because the back surface of the mother board 12 corresponding to the position where the circuit 12A is mounted sets electronic components thereon. Accordingly, the heat dissipating path for the circuit 12A is left along the mother board 12, which may thermally isolate the TOSA 20 from the heat generated in the circuit 12A.

While several embodiments and variations of the present invention are described in detail herein, it should be apparent that the disclosure and teachings of the present invention will suggest many alternative designs to those skilled in the art.

What is claimed is:

1. An optical transceiver, comprising:
    a TOSA configured to install a semiconductor LD integrated with an optical modulator, said TOSA providing a first group of lead pins and a second group of lead pins;
    a first circuit board configured to mount a driving circuit that generates a driving signal to drive said optical modulator;
    a second circuit board configured to mount a bias circuit that provides a bias to said semiconductor LD;
    an LF FPC board configured to connect said first circuit board to said second circuit board electrically;
    an RF FPC board configured to connect said TOSA directly to said first circuit board,
    wherein said first group of lead pins of said TOSA transmitting said driving signal and directly connected to said RF FPC board, said second group of said lead pins providing said bias to said TOSA, and
    wherein said driving signal is provided to said TOSA through said RF FPC board without transmitting in said second circuit board.

2. The optical transceiver of claim 1,
    wherein said first group of lead pins are extracted along a longitudinal direction of said optical transceiver, and
    wherein said RF FPC board provides an electrode and an interconnection, said electrode being connected to said first circuit board and extending along a transverse direction of said optical transceiver, said interconnection carrying said driving signal thereon and being connected to said electrode and one of said first group of lead pins, said interconnection being bent substantially in a right angle on said RF FPC board.

3. The optical transceiver of claim 2,
    wherein said RF FPC board has a pinched portion in an intermediate thereof.

4. The optical transceiver of claim 1,
    wherein said first circuit board and said second circuit board are arranged in up-and-down relation in said optical transceiver.

5. The optical transceiver of claim 4,
    wherein said first group of lead pins are bent toward said second circuit board.

6. The optical transceiver of claim 4,
further comprising a ROSA with a base for mounting a device to generate heat and a housing including a top and a bottom,
wherein said TOSA provides a base for mounting a device to generate heat, and
wherein said base of said TOSA comes in contact with one of said top and bottom of said housing, said base of said ROSA coming in contact with other of said top and bottom of said housing.

7. The optical transceiver of claim 1,
wherein said LF FPC board provides an electrode connected to said first circuit board and another electrode connected to said second circuit board, and
wherein said electrode is diagonally formed to said another electrode on said LF FPC board.

8. The optical transceiver of claim 1,
wherein said LF FPC board provides an electrode connected to said first circuit board and another electrode connected to said second circuit board, and
wherein said electrode and another electrode are formed in offset with respect to a longitudinal axis of said optical transceiver.

* * * * *